United States Patent
Lopez Gonzalez et al.

(10) Patent No.: US 10,160,295 B1
(45) Date of Patent: Dec. 25, 2018

(54) SUN VISOR ASSEMBLY HAVING A SLIDE PANEL

(71) Applicant: FORD GLOBAL TECHNOLOGIES, LLC, Dearborn, MI (US)

(72) Inventors: Luis Miguel Lopez Gonzalez, Mexico City (MX); Jorge Adolfo Miranda Nieto, Leon (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/634,266

(22) Filed: Jun. 27, 2017

(51) Int. Cl.
*B60J 3/02* (2006.01)

(52) U.S. Cl.
CPC ........... *B60J 3/0208* (2013.01); *B60J 3/0239* (2013.01)

(58) Field of Classification Search
CPC ...................................................... B60J 3/0208
USPC ................................................ 296/97.8, 97.6
See application file for complete search history.

(56) References Cited

U.S. PATENT DOCUMENTS

| | | | |
|---|---|---|---|
| 4,362,330 A * | 12/1982 | Cramer | B60J 3/0208 296/97.3 |
| 5,042,867 A * | 8/1991 | Crotty, III | B60J 3/0208 296/97.11 |
| 5,316,361 A | 5/1994 | Miller | |
| 5,365,416 A | 11/1994 | Peterson | |
| 5,431,473 A * | 7/1995 | Hiemstra | B60J 3/0282 296/97.2 |
| 5,749,618 A | 5/1998 | Jones | |
| 5,951,091 A * | 9/1999 | Vanderkuyl | B60J 3/0208 296/97.8 |
| 6,309,004 B1 * | 10/2001 | McNutt | B60J 3/0208 296/97.6 |
| 6,325,443 B1 * | 12/2001 | Sanchez | B60J 3/0208 296/97.6 |
| 6,543,832 B1 | 4/2003 | Bogdanski et al. | |
| 6,598,928 B1 * | 7/2003 | Drake | B60J 3/0208 296/97.1 |
| 8,544,933 B1 | 10/2013 | Fuller | |
| 8,550,531 B1 | 10/2013 | Fancher, III | |
| 9,073,409 B1 | 7/2015 | Daman | |
| 2009/0278374 A1 * | 11/2009 | Akiya | B60J 3/0204 296/97.6 |
| 2013/0320700 A1 | 12/2013 | Curtis et al. | |
| 2016/0318378 A1 * | 11/2016 | Nedelman | B60J 3/0239 |

FOREIGN PATENT DOCUMENTS

| | | | | |
|---|---|---|---|---|
| DE | 3341509 A1 * | 5/1985 | ............ | B60J 3/0208 |
| DE | 29520174 U1 * | 2/1996 | ............ | B60J 3/0208 |
| EP | 2543530 A1 * | 1/2013 | ............ | B60J 3/0208 |
| ES | 2208008 A1 | 6/2004 | | |

OTHER PUBLICATIONS

English Machine Translation of ES2208008A1.

* cited by examiner

*Primary Examiner* — Hilary L Gutman
(74) *Attorney, Agent, or Firm* — Vichit Chea; King & Schickli, PLLC

(57) ABSTRACT

A sun visor assembly includes a visor body having a surface indentation, a slide panel and a guide feature. The guide feature connects the slide panel to the visor body and allows the slide panel to be displaced between a stowed position nested within the surface indentation and a deployed position projecting from the visor body to provide an expanded surface area for shielding the eyes of the driver from direct sunlight and/or glare.

7 Claims, 7 Drawing Sheets

SUN VISOR ASSEMBLY HAVING A SLIDE PANEL

TECHNICAL FIELD

This document relates generally to the motor vehicle equipment field and, more particularly, to a new and improved sun visor assembly having a slide panel that may be displaced to a deployed position to provide for additional side coverage to block sun rays that might otherwise adversely affect a driver's vision when driving a motor vehicle.

BACKGROUND

It is known in the art to equip a motor vehicle with one or more sun visors that may be deployed to shield the eyes of the driver and front seat passenger from direct or glaring light. More particularly, direct sunlight can be particularly annoying when the sun is lower in the sky, such as in the morning when the sun is rising, in the evening when the sun is setting or during winter months when the sun stays closer to the horizon.

Package considerations limit the range of motion and surface area of a sun visor. In order to provide enhanced shielding, current sun visor designs are able to provide additional side coverage to the driver and passenger through several means: slide on rod visors that move all the components through each of the required zones, dual blade designs that add weight and cost, big sun visor blades that increase coverage or blade inserts that take extra volume inside the component and decrease the craftsmanship of the part.

This document relates to a new and improved sun visor assembly incorporating a slide panel that may be deployed to provide extra surface area outboard of the main visor body for shielding the eyes of a driver or passenger of the motor vehicle. Advantageously, the new and improved sun visor assembly is characterized by a minimal visor body volume, avoiding the typical chunky look of a visor assembly incorporating an extension blade or slide panel. Thus the sun visor assembly provides a sleek, trim look while still incorporating a slide panel that may be deployed for extra surface to shield the sun from the eyes of a motor vehicle operator or front seat passenger.

SUMMARY

In accordance with the purposes and benefits described herein, a new and improved sun visor assembly is provided. That sun visor assembly comprises a visor body having a surface indentation, a slide panel and a guide feature. The guide feature connects the slide panel to the visor body while also allowing the slide panel to be displaced between a stowed position within the surface indentation and a deployed position projecting outboard from the visor body.

The sun visor assembly may further include a releasable locking feature configured to secure the slide panel in the stowed position. That releasable locking feature may include a spring-loaded detent carried on the visor body and a push-button actuator carried on the slide panel. That push-button actuator may be captured in a receiver on the slide panel.

The slide panel may include a first face oriented toward the visor body and a second face opposite the first face and oriented away from the visor body. The guide feature may include a channel formed in the first face. Further, the guide feature may also include a guide track carried on the visor body and received in the channel. The channel and the guide track may have at least one beveled interface.

The sun visor assembly may also include a second spring-loaded detent in the guide track. The sun visor assembly may further include a catcher carried on the first face. The catcher may engage the second spring-loaded detent when the slide panel is in the stowed position. Further the sun visor assembly may include a stop carried on the first face. The stop may engage the second spring-loaded detent when the slide panel is in the deployed position.

Still further, the surface indentation of the sun visor assembly may have a depth $D_1$ and the slide panel may have a thickness $T_1$ wherein $D_1 = T_1$ so that the slide panel fits flush in the visor body when in the stowed position.

The surface indentation may have a shoulder and the slide panel may have a first edge wherein the shoulder and the first edge are complimentary in shape. Further, the surface indentation and the slide panel may correspond in shape. Thus, the slide panel may be fully confined within the outer perimeter of the surface indentation on the visor body when in the stowed position.

In accordance with an additional aspect, a sun visor body is provided. The sun visor comprises a visor body having a surface indentation and a slide panel carried on the visor body. The slide panel is displaceable between a stowed position in the surface indentation and a deployed position projecting from and outboard the visor body. Further the surface indentation and the slide panel may correspond in shape so that the slide panel is fully integrated with the visor body when the slide panel is in the stowed position for a trim, sleek appearance.

In the following description, there are shown and described several preferred embodiments of the sun visor assembly and the sun visor. As it should be realized, the sun visor assembly and the sun visor are capable of other, different embodiments and their several details are capable of modification in various, obvious aspects all without departing from the sun visor assembly and sun visor as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the sun visor assembly and sun visor and together with the description serve to explain certain principles thereof.

Reference will now be made in detail to the present preferred embodiments of the sun visor assembly and sun visor, examples of which are illustrated in the accompanying drawing figures.

DETAILED DESCRIPTION

Figure 1:
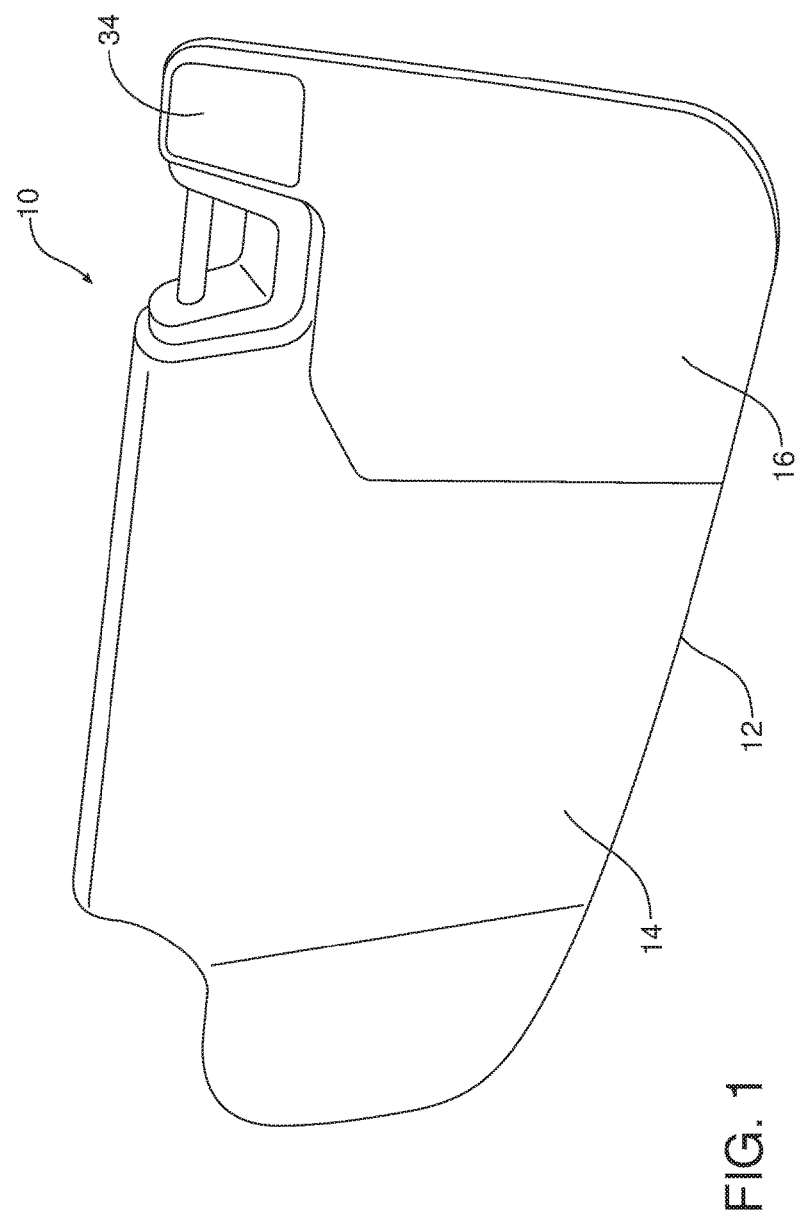
FIG. 1 is a perspective view of the sun visor assembly illustrating the slide panel in the stowed position nested in and fully contained within the surface indentation of the visor body.
Figure 2:
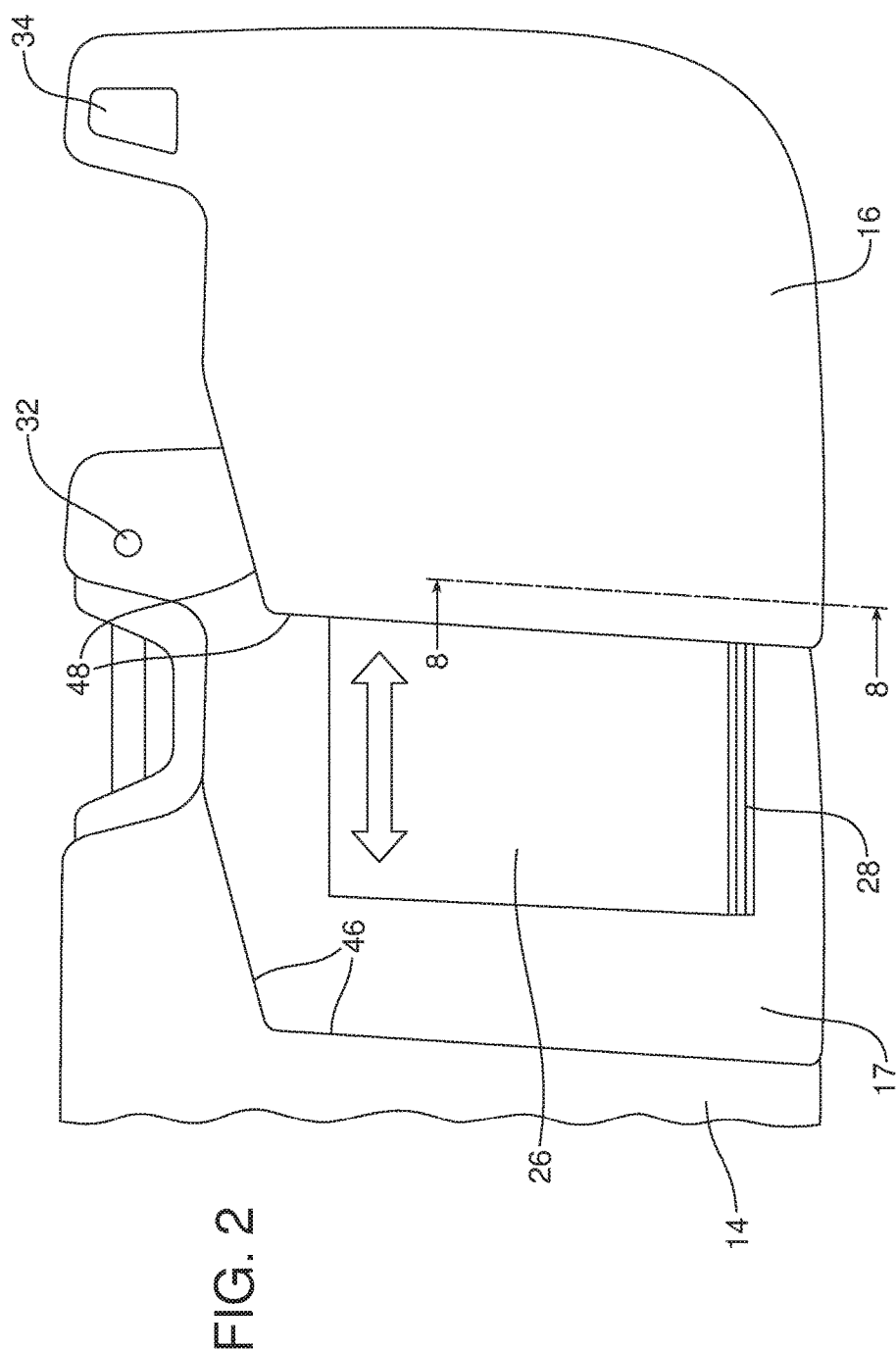
FIG. 2 is a detailed plan view of the sun visor assembly illustrated in FIG. 1 but illustrating the slide panel in the deployed position projecting from the visor body.
Figure 3:
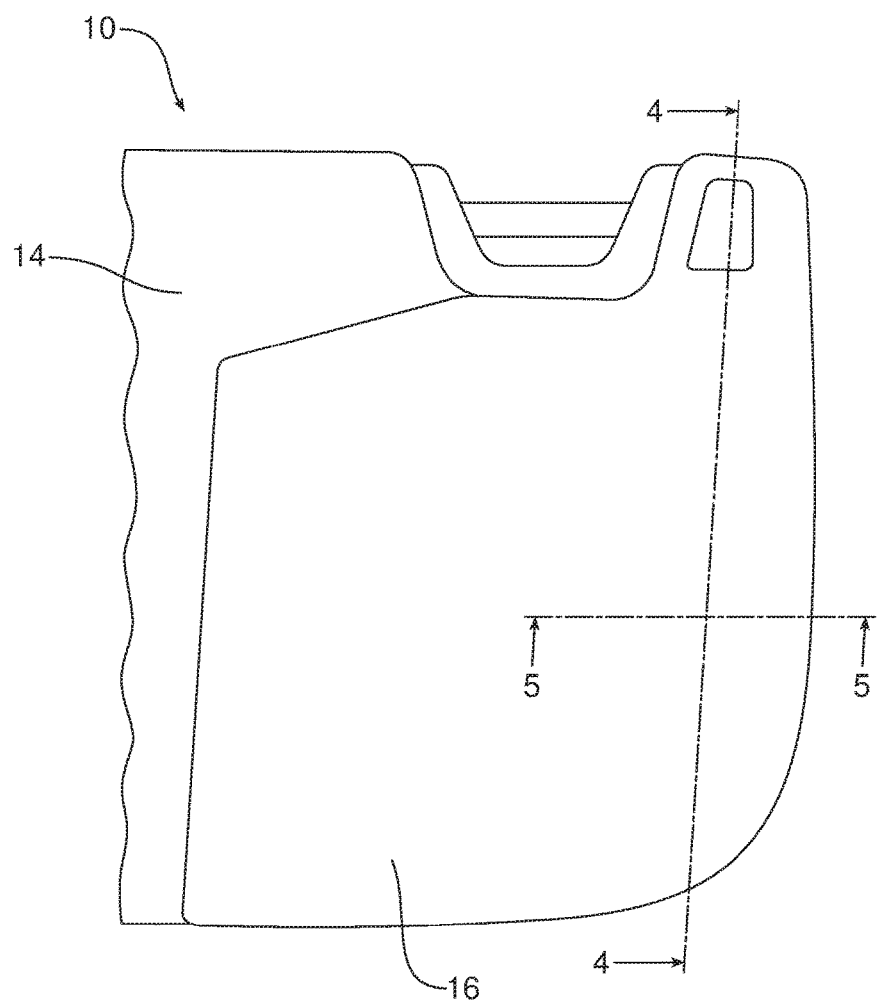
FIG. 3 is a view similar to FIG. 2 but illustrating the slide panel in the stowed position.

Reference is now made to FIGS. 1-8 illustrating the new and improved sun visor assembly 10. The sun visor assembly 10 includes a sun visor 12 comprising a visor body 14 and an integrated slide panel 16. A guide feature, generally designated by reference numeral 18, connects the slide panel 16 to the visor body 14 and allows the slide panel to be displaced between a stowed position nesting in the surface indentation 17 of the visor body 14 as illustrated in FIGS. 1 and 3 and a deployed position projecting from or outboard the visor body as illustrated in FIG. 2. When deployed, the slide panel 16 extends the shielding surface of the sun visor 12 to better shield the eyes of the motor vehicle operator or front seat passenger under certain conditions such as when the sun is low in the sky.

Figure 4:
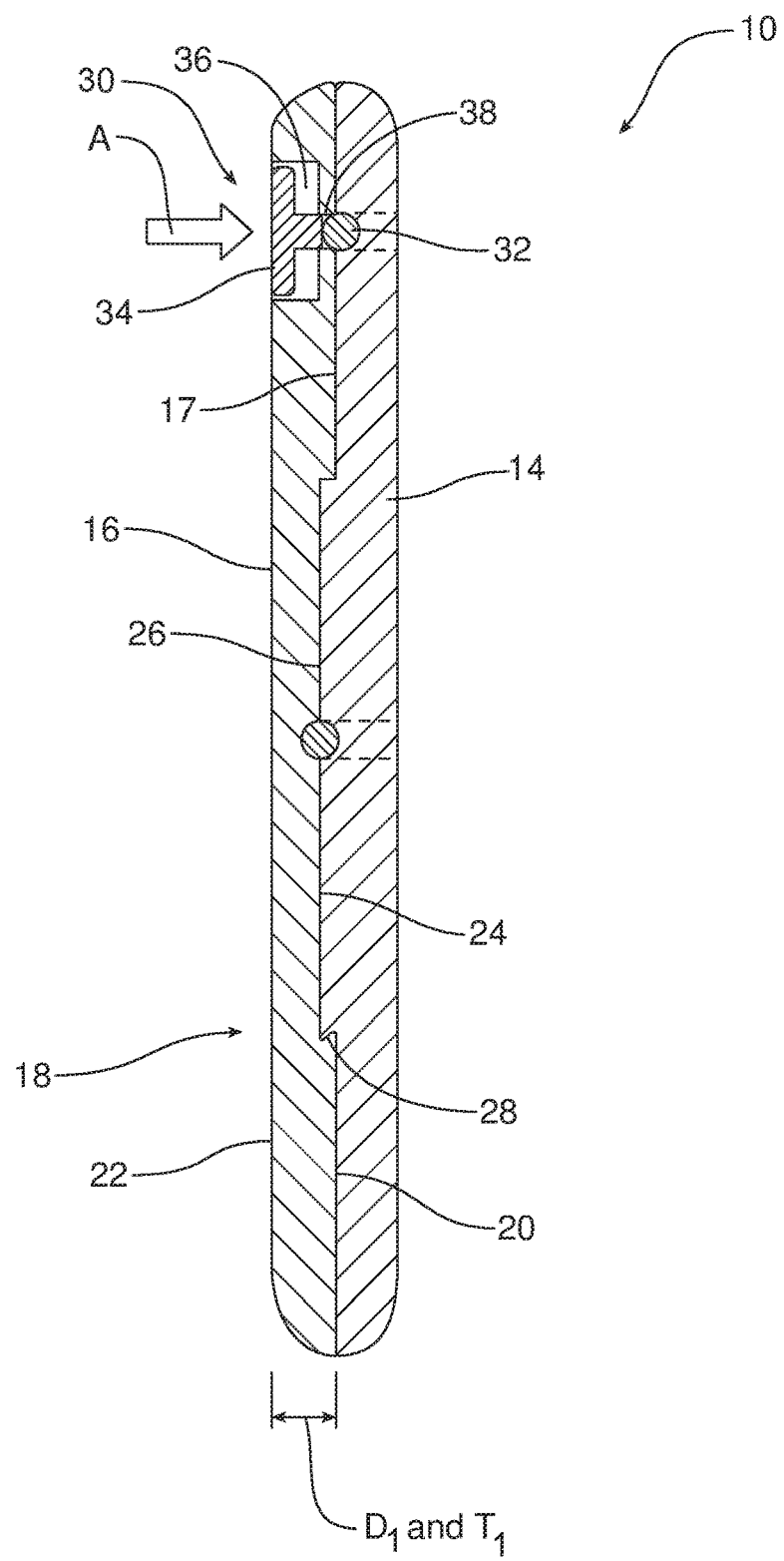
FIG. 4 is a cross-sectional view taken along line 4-4 of FIG. 3.
Figure 5:
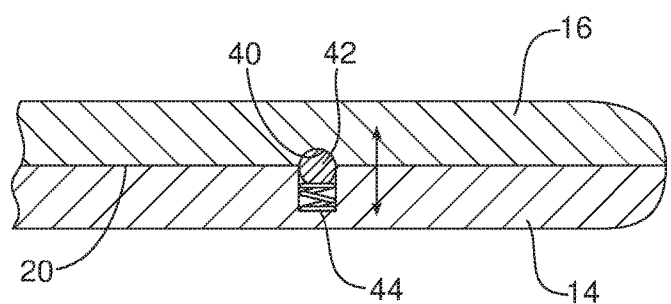
FIG. 5 is a cross-sectional view taken along line 5-5 of FIG. 3.
Figure 6:
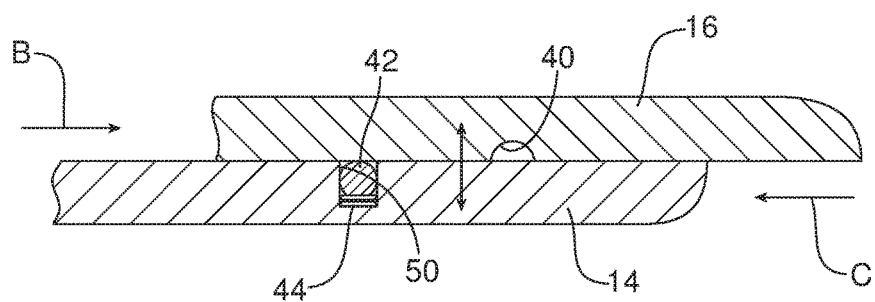
FIG. 6 is a cross-sectional view also taken along line 5-5 of FIG. 3 when the slide panel is being deployed from the stowed position to the deployed position.
Figure 7:
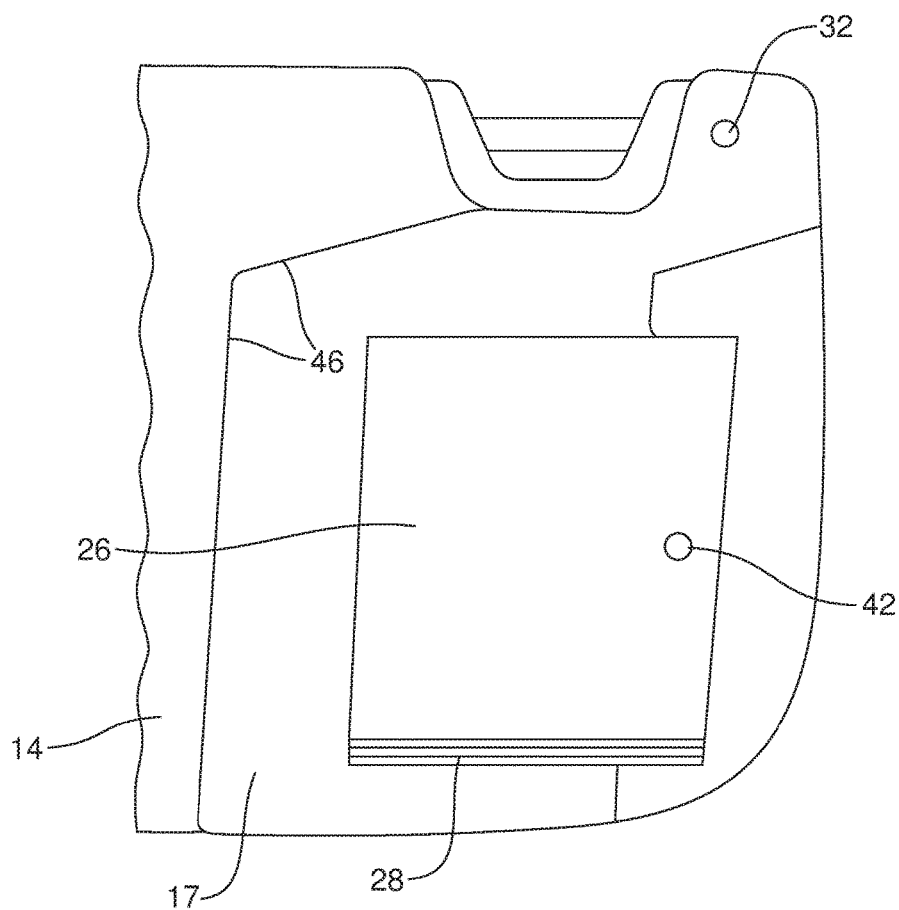
FIG. 7 is a detailed plan view of the visor body with the slide panel removed so as to better illustrate the guide feature that connects the slide panel and the visor body and the position of the detents on the visor body.

As illustrated in FIG. 4, the slide panel 16 includes a first face 20 oriented toward and juxtaposed to the visor body 14 and a second face 22 opposite the first face oriented away from the visor body.

In the embodiment illustrated in FIG. 4, the guide feature 18 includes a channel 24 formed in the first face 20 and a cooperating guide track 26 carried on the visor body 14 and received in the channel. In the embodiment illustrated in FIG. 4, the guide track 26 includes at least one beveled interface 28 to insure that the guide track 26 is captured in the channel 24 and the slide panel 16 is maintained on the visor body 14.

The sun visor assembly 10 also includes a releasable locking feature, generally designated by reference numeral 30, that is configured to secure the slide panel 16 in the stowed position. As best illustrated in FIG. 4, the releasable locking feature 30 includes a spring-loaded detent 32 carried on the visor body 14 and biased toward the slide panel 16 and a push-button actuator 34 carried on the slide panel 16. More particularly, the push-button actuator 34 is captured in a receiver 36 formed in the slide panel 16. When the slide panel 16 is in the stowed position illustrated in FIGS. 1, 3, 4, and 5, the spring-loaded detent 32 is engaged in an aperture 38 provided in the slide panel 16 at the bottom or closed end of the receiver 36. In addition, a catcher 40 carried on the first face 20 of the slide panel 16 engages a second spring-loaded detent 42 carried on the visor body 14. Note particularly spring 44 biasing the detent 42 into the catcher 40 in FIG. 5.

As noted above, when the slide panel 16 is in the stowed position, it fully nests in and is fully contained within the outer perimeter of the surface indentation 17 in the visor body 14. Toward this end, the surface indentation 17 and the slide panel 16 substantially correspond in shape. Thus, the surface indentation 17 has a shoulder 46 and the slide panel 16 has a first edge 48 that are complementary in shape. In addition, as illustrated in FIG. 4, the surface indentation 17 has a depth $D_1$ and the slide panel 16 has a thickness $T_1$ wherein $D_1=T_1$ so that the slide panel fits flush in the visor body when in the stowed position.

Figure 8:
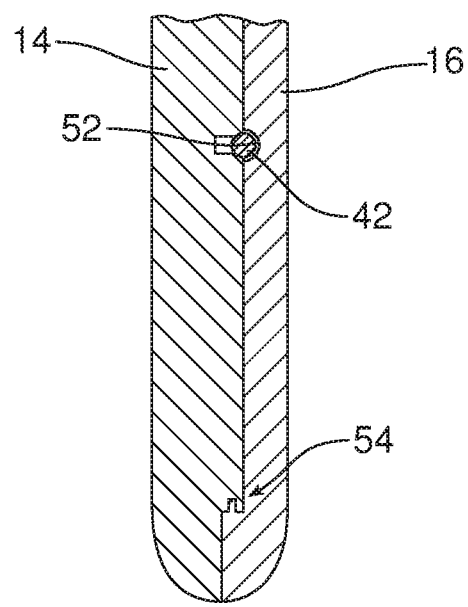
FIG. 8 is a cross-sectional view taken along line 8-8 of FIG. 2 and illustrating the stop carried on the first face in engagement with the second spring-loaded detent when the slide panel is in the fully deployed position.

One may displace the slide panel 16 from the stowed position illustrated in FIGS. 1, 3 and 4 to the deployed position illustrated in FIGS. 2 and 8 by (a) depressing the push-button actuator 34 (note action arrow A in FIG. 4) to displace the spring-loaded detent 32 out of the locking aperture 38 and then (b) sliding the slide panel 16 in the direction of action arrow B (see FIG. 6) with respect to the visor body 14. As this is done, the spring-loaded detent 42 slides up the wall of the catcher 40 and is depressed into the receiver 50 in the visor body 14 against the force of the biasing spring 44.

Once the slide panel 16 is in the fully deployed position, a stop 52 carried on the first face 20 of the slide panel 16 engages the second spring-loaded detent 42. This is best illustrated in FIG. 8 which is a cross section taken along line 8-8 of FIG. 2. This prevents one from inadvertently sliding the slide panel 16 off of the guide track 26 on the visor body 14.

When one wishes to return the slide panel 16 to the stowed position from the deployed position, one pushes the slide panel in the direction of action arrow C (note FIG. 6) until the slide panel is once again fully nested in the surface indentation 17 in the visor body 14 with the detent 32 received in the locking aperture 38 and the detent 42 received in the catcher 40.

The foregoing has been presented for purposes of illustration and description. It is not intended to be exhaustive or to limit the embodiments to the precise form disclosed. Obvious modifications and variations are possible in light of the above teachings. For example, as illustrated in FIG. 8, the beveled interface 28 of the guide track 26 may be replaced by a tongue in groove interface 54. All such modifications and variations are within the scope of the appended claims when interpreted in accordance with the breadth to which they are fairly, legally and equitably entitled.

What is claimed:

1. A sun visor assembly, comprising:
   a visor body having a surface indentation;
   a slide panel including a first face oriented toward said visor body and a second face opposite said first face and oriented away from said visor body;
   a guide feature connecting said slide panel to said visor body whereby said slide panel may be displaced between a stowed position in said surface indentation and a deployed position projecting from said visor body, said guide feature including a guide track, carried on said visor body, and a channel, formed in said first face of said slide panel, having at least one beveled interface, said guide track being received in said channel;
   a releasable locking feature configured to secure said slide panel in said stowed position, said releasable locking feature including a first spring-loaded detent carried on said visor body, a second spring-loaded detent in said guide track, a push button actuator captured in a receiver on said slide panel, a catcher carried on said first face and engaging in said second spring-loaded detent when said slide panel is in said stowed position; and
   a stop carried on said first face, said stop engaging said second spring-loaded detent when said slide panel is in said deployed position.

2. The sun visor assembly of claim 1, wherein said surface indentation has a depth $D_1$ and said slide panel has a thickness $T_1$ wherein $D_1=T_1$ so that said slide panel fits flush in said visor body when in said stowed position.

3. The sun visor assembly of claim 2, wherein said surface indentation has a shoulder and said slide panel has a first edge wherein said shoulder and said first edge are complimentary in shape.

4. The sun visor assembly of claim 3, wherein said surface indentation and said slide panel correspond in shape.

5. The sun visor assembly of claim 1, wherein said surface indentation and said slide panel correspond in shape.

6. A sun visor, comprising:
- a visor body having a surface indentation and a guide track; and
- a slide panel carried on said visor body, said slide panel being displaceable between a stowed position in said surface indentation and a deployed position projecting from said visor body;
- said sun visor being characterized by said slide panel having a stop carried on a first face, said stop engaging a second spring loaded detent in said guide track when said slide panel is in said deployed position.

7. The sun visor of claim 6, wherein said surface indentation and said slide panel correspond in shape.

\* \* \* \* \*